US011789554B2

(12) United States Patent
Agrawal et al.

(10) Patent No.: US 11,789,554 B2
(45) Date of Patent: Oct. 17, 2023

(54) TASK INVOCATION BASED ON CONTROL ACTUATION, FINGERPRINT DETECTION, AND GAZE DETECTION

(71) Applicant: Motorola Mobility LLC, Chicago, IL (US)

(72) Inventors: Amit Kumar Agrawal, Bangalore (IN); Gautham Prabhakar Natakala, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/942,297

(22) Filed: Jul. 29, 2020

(65) Prior Publication Data
US 2022/0035466 A1 Feb. 3, 2022

(51) Int. Cl.
| | |
|---|---|
| *G06F 3/041* | (2006.01) |
| *G06F 3/01* | (2006.01) |
| *H04M 1/72454* | (2021.01) |
| *G06V 40/13* | (2022.01) |
| *G06V 40/70* | (2022.01) |
| *G06V 40/16* | (2022.01) |

(52) U.S. Cl.
CPC .............. *G06F 3/041* (2013.01); *G06F 3/013* (2013.01); *G06V 40/13* (2022.01); *G06V 40/171* (2022.01); *G06V 40/70* (2022.01); *H04M 1/72454* (2021.01); *G06F 2203/04106* (2013.01); *H04M 2250/12* (2013.01)

(58) Field of Classification Search
CPC ...................... G06F 3/041; G06F 3/013; G06F 2203/04106; G06K 9/00013; G06K 9/00281; G06K 9/00892; H04M 1/72454; H04M 2250/12
See application file for complete search history.

(56) References Cited

U.S. PATENT DOCUMENTS

| | | | |
|---|---|---|---|
| 2014/0247208 A1* | 9/2014 | Henderek | G06F 3/0487 345/156 |
| 2016/0109947 A1* | 4/2016 | George-Svahn | G06F 3/03547 345/156 |
| 2017/0083695 A1* | 3/2017 | San Agustin | G06F 3/013 |
| 2017/0090566 A1* | 3/2017 | George-Svahn | G06F 3/013 |
| 2017/0235360 A1* | 8/2017 | George-Svahn | G06F 3/03547 345/173 |
| 2017/0318019 A1* | 11/2017 | Gordon | H04L 9/3226 |
| 2019/0080189 A1* | 3/2019 | Van Os | H04N 5/23216 |

(Continued)

OTHER PUBLICATIONS

"Honor 9x Fingerprint Scanner Setup and Performance—FP Sensor on Power Button", Video Available at https://www.youtube.com/watch?v=GByQHdOh3zU Start at 2:02 Retrieved Jul. 8, 2020, Sep. 5, 2019, 4 pages.

(Continued)

*Primary Examiner* — David D Davis
(74) *Attorney, Agent, or Firm* — FIG. 1 Patents

(57) ABSTRACT

Techniques for task invocation based on control actuation, fingerprint detection, and gaze detection are described, and may be implemented via a mobile device to verify that a task associated with an actuatable control is to be executed. Generally, the described techniques assist in preventing inadvertent (e.g., unintended) user actuation of a control from invoking a task associated with the control.

20 Claims, 9 Drawing Sheets

(56) References Cited

U.S. PATENT DOCUMENTS

2019/0324531 A1* 10/2019 Eraslan ................. G06F 3/167
2020/0026835 A1* 1/2020 Mitchell ............. G06F 3/03543

OTHER PUBLICATIONS

Brownlee, Marques, "Samsung Galaxy S10e Review: Why Not?", Video available at https://www.youtube.com/watch?v=TI4PXFUOPR8 Start 3:13 Retrieved Jul. 8, 2020, Mar. 12, 2019, 3 pages.

Drewes, Heiko et al., "Eye-Gaze Interaction for Mobile Phones", Mobility '07: Proceedings of the 4th international conference on mobile technology, applications, and systems and the 1st international symposium on Computer human interaction in mobile technology, Sep. 2007, 8 pages.

Jaimes, Alejandro et al., "Multimodal Human Computer Interaction: A Survey", Computer Vision in Human-Computer Interaction. HCI 2005. Lecture Notes in Computer Science, vol. 3766, Oct. 21, 2005, 31 pages.

Morimoto, Carlos H. et al., "Eye gaze tracking techniques for interactive applications", Computer Vision and Image Understanding, vol. 98, Issue 1, Nov. 11, 2004, 21 pages.

* cited by examiner

TASK INVOCATION BASED ON CONTROL ACTUATION, FINGERPRINT DETECTION, AND GAZE DETECTION

BACKGROUND

Modern devices are implemented in a variety of different form factors and provide an array of different functionality. For instance, mobile devices such as smartphones and tablets provide compact sources of functionality such as wireless communication, image capture, games, social media, web browsing, and so forth. To enable functionality of a mobile device to be accessed, typical mobile devices include different controls such as hardware buttons, touch screens, and so forth, that can receive user interaction to activate the devices and access available functions. For instance, most devices currently include a power button for powering on and waking a device, as well as some form of fingerprint sensor for user authentication. In fact, some devices combine a power button with fingerprint sensing capability to enable combined functionality, such as device waking and unlocking via interaction with a single integrated control. Having such a single combined control, however, introduces a number of implementation challenges. For instance, inadvertent user contact with such a control can cause unwanted device unlocking.

BRIEF DESCRIPTION OF THE DRAWINGS

Aspects of task invocation based on control actuation, fingerprint detection, and gaze detection are described with reference to the following Figures. The same numbers may be used throughout to reference similar features and components that are shown in the Figures.

DETAILED DESCRIPTION

Figure 1:
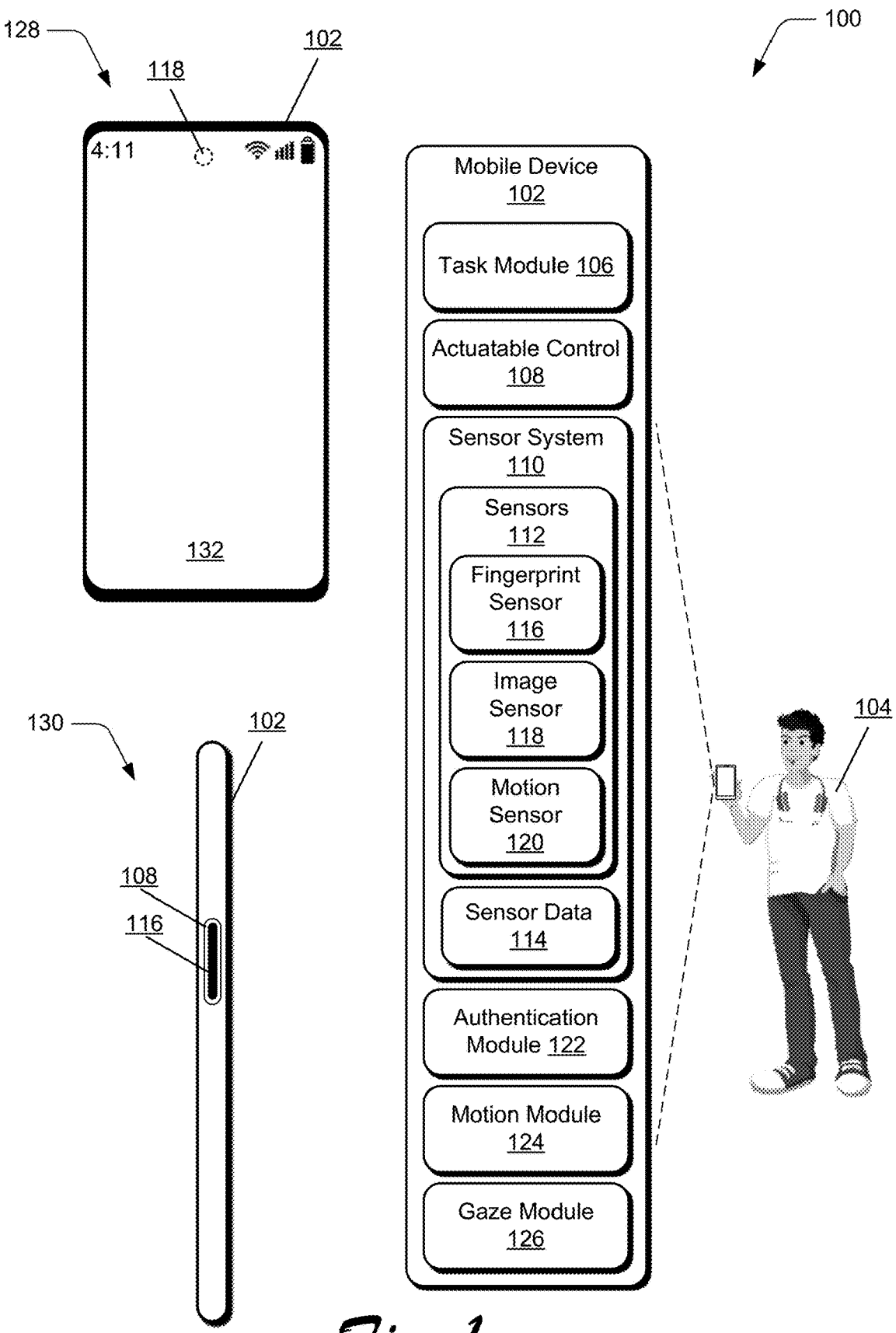
FIG. 1 illustrates an example environment in which aspects of task invocation based on control actuation, fingerprint detection, and gaze detection can be implemented.

Techniques for task invocation based on control actuation, fingerprint detection, and gaze detection are described, and may be implemented via a mobile device to verify that a task associated with an actuatable control is to be executed. Generally, the described techniques assist in preventing inadvertent (e.g., unintended) user actuation of a control from invoking a task associated with the control.

According to various implementations, a mobile device includes an actuatable control (e.g., a hardware control) with an integrated fingerprint sensor. The actuatable control, for instance, is selectable to invoke various functionality, such as a device power button that is selectable to power on the mobile device, wake the mobile device, unlock the mobile device, and so forth. Alternatively or in addition the actuatable control can invoke other instances of functionalities, such as a device camera, communication functionality, applications and/or processes, and so forth. Further, the fingerprint sensor can detect a pattern of a fingerprint in contact with the actuatable control. For example, a single user touch to the actuatable control can initiate a task associated with the control and perform user authentication based on a fingerprint in contact with the actuatable control. Fingerprint authentication, for example, determines whether a fingerprint detected in contact with the fingerprint sensor matches an "enrolled" fingerprint. Generally, an enrolled fingerprint represents a fingerprint that is registered as associated with a particular user identity that is permitted to invoke functionality associated with the selectable control.

To verify a task is to be invoked in response to user selection of an actuatable control, the described techniques monitor for user gaze relative to the mobile device. Monitoring for user gaze, for instance, involves determining whether a user's eyes are engaged with the mobile device, e.g., are looking directly at the mobile device. Detecting that a user's gaze is incident on the mobile device, for instance, can indicate that user intends to actuate the actuatable control. Conversely, absence of a user's gaze on the mobile device can indicate that actuation of the actuatable control is unintentional and thus that a user does not intend to actuate the control and invoke functionality associated with the control.

Accordingly, when actuation of an actuatable control and contact by an enrolled fingerprint are detected at a mobile device, a determination is made whether a user gaze is detected at the mobile device. An image sensor of the mobile device, for example, captures an image of a physical environment adjacent the mobile device, such as an area in front of a display of the mobile device. The image is then processed to determine if a user's gaze is detected. If a user's gaze is detected, a task associated with selection of the selectable control is invoked, such as unlocking the mobile device from a locked state. However, if a user's gaze is not detected, selection of the selectable control can be disregarded. For instance, the mobile device remains in a locked and/or hibernated state despite actuation of the actuatable control.

In at least some implementations, motion of a mobile device can be used to execute logic for determining whether to invoke a task associated with a selected actuatable control. For instance, when a mobile device is detected as exhibiting little or no motion (e.g., the device is stationary) when an actuatable control is selected, gaze detection can be utilized to determine whether to invoke a task associated with the control. However, if the mobile device exhibits changes in motion (e.g., increases and decreases in motion), gaze detection can be modified to adapt to changes in user gaze duration. For instance, if the mobile device exhibits changes in detected motion when an actuatable control is selected via an enrolled finger, verifying that user gaze is detected can be based on a gaze detection threshold time period. If user gaze is detected and persists after the threshold time period, a task can be invoked and remain invoked. However, if user gaze is detected and then lost within the threshold time period, the task can be invoked and then revoked. Generally, the latter occurrence can indicate that a user inadvertently selected the selected control and thus likely did not intend to invoke a task associated with the selectable control.

Thus, the described techniques enable verification that tasks associated with selection of device controls are to be invoked when the controls are selected. This increases device and data security by ensuring that certain tasks are not inadvertently performed when an actuatable control is selected, such as unlocking a device and enabling access to functionality of the device. Further, power resources (e.g., battery charge) can be conserved by avoiding inadvertent invoking of various tasks that utilize power resources, such as unlocking a device that causes a display of the device to be activated.

While features and concepts of task invocation based on control actuation, fingerprint detection, and gaze detection can be implemented in any number of different devices, systems, environments, and/or configurations, aspects of task invocation based on control actuation, fingerprint detection, and gaze detection are described in the context of the following example devices, systems, and methods.

FIG. 1 illustrates an example environment 100 in which aspects of task invocation based on control actuation, fingerprint detection, and gaze detection can be implemented. The example environment 100 includes a mobile computing device ("mobile device") 102 that represents a portable device that can be carried by a user 104, such as a smartphone, a tablet device, a laptop, a wearable computing device, (e.g., a smartwatch or a fitness tracker), and so forth. These examples are not to be construed as limiting, however, and the mobile device 102 can be implemented in a variety of different ways and form factors. Further example attributes of the mobile device 102 are discussed below with reference to the device 900 of FIG. 9.

The mobile device 102 includes various functionality that enables the mobile device 102 to perform different aspects of task invocation based on control actuation, fingerprint detection, and gaze detection discussed herein, including a task module 106, an actuatable control 108, and a sensor system 110. The task module 106 represents functionality (e.g., hardware and logic) that enables the mobile device 102 to perform various tasks, such as powering on, waking, unlocking, authentication, and so forth. The task module 106, for instance, enables the mobile device 102 to power on and/or wake from a dormant state The actuatable control 108 represents a control (e.g., a hardware button) that is selectable to invoke functionality of the task module 106. In at least one implementation, the actuatable control 108 is selectable to cause the task module 106 to power on and/or wake the mobile device 102 from a dormant state. The actuatable control 108 may be implemented in various ways, such as a mechanical control, a force sensor, a touch sensor (e.g., a capacitive sensor), and so forth.

The sensor system 110 is representative of functionality to detect various physical and/or logical phenomena in relation to the mobile device 102, such as biometric phenomena, motion, light, image detection and recognition, time and date, position, location, touch detection, temperature, and so forth. To enable the sensor system 110 to detect such phenomena, the sensor system 110 includes sensors 112 that are configured to generate sensor data 114. Examples of the sensors 112 include hardware and/or logical sensors such as an accelerometer, a gyroscope, a camera, a microphone, a clock, biometric sensors, touch input sensors, position sensors, environmental sensors (e.g., for temperature, pressure, humidity, and so on), geographical location information sensors (e.g., Global Positioning System (GPS) functionality), and so forth. In at least some implementations, the sensor data 114 represents raw sensor data collected by the sensors 112. Alternatively or in addition, the sensor data 114 represents raw sensor data from the sensors 112 that is processed to generate processed sensor data, such as sensor data from multiple sensors 112 that is combined to provide more complex representations of mobile device 102 state than can be provided by a single sensor 112.

The sensors 112 include a fingerprint sensor 116, an image sensor 118, and a motion sensor 120. The fingerprint sensor 116 represents functionality for detecting attributes of a user's finger (including a user's thumb), such as for detecting physical characteristics of a user's fingerprint. The image sensor 118 represents functionality for capturing visual attributes of objects in vicinity to the mobile device 102. For instance, the image sensor 118 can include a camera that can be leveraged to capture images of surrounding objects, such as the user 104. The motion sensor 120 represents functionality for detecting relative motion of the mobile device 102, such as whether the mobile device 102 is stationary or moving, a direction of movement of the mobile device 102, and an amount (e.g., distance and/or duration) of movement of the mobile device 102.

The mobile device 102 further includes an authentication module 122, a motion module 124, and a gaze detector module ("gaze module") 126. The authentication module 122 represents functionality for authentication access to various functionality of the mobile device 102. For instance, the authentication module 122 can authenticate that a fingerprint in contact with the fingerprint sensor 116 matches a fingerprint for an enrolled user. The motion module 124 represents functionality for characterizing motion of the mobile device 102. The motion module 124, for instance, receives motion data from the motion sensor 120 and can utilize the motion data to generate notifications of different motion states of the mobile device 102, such as whether the mobile device is stationary, in motion, and a relative amount of motion of the mobile device. In at least some implementations, the motion module 124 utilizes different motion thresholds to characterize motion of the mobile device 102.

The gaze module 126 represents functionality to determine whether a user's gaze is incident on the mobile device 102. For instance, the gaze module 126 utilizes captured image data from the image sensor 118 to determine whether or not a user's gaze is directed toward the mobile device 102.

The environment 100 further depicts a front view 128 and a side view 130 of the mobile device 102. The front view 128 illustrates a display screen 132 of the mobile device and an instance of the image sensor 118. The side view 130 illustrates an implementation of the actuatable control 108. In this particular example, the actuatable control 108 incorporates an instance of the fingerprint sensor 116. For instance, the user 104 can apply finger contact to the actuatable control 108 to invoke functionality of the task module 106 via both physical actuation of the actuatable control 108 and fingerprint recognition implemented via the fingerprint sensor 116. Further, and as detailed below, gaze detection enabled by the gaze module 126 can be utilized as an intent verification factor for invoking operation of the task module 106.

Figure 2:
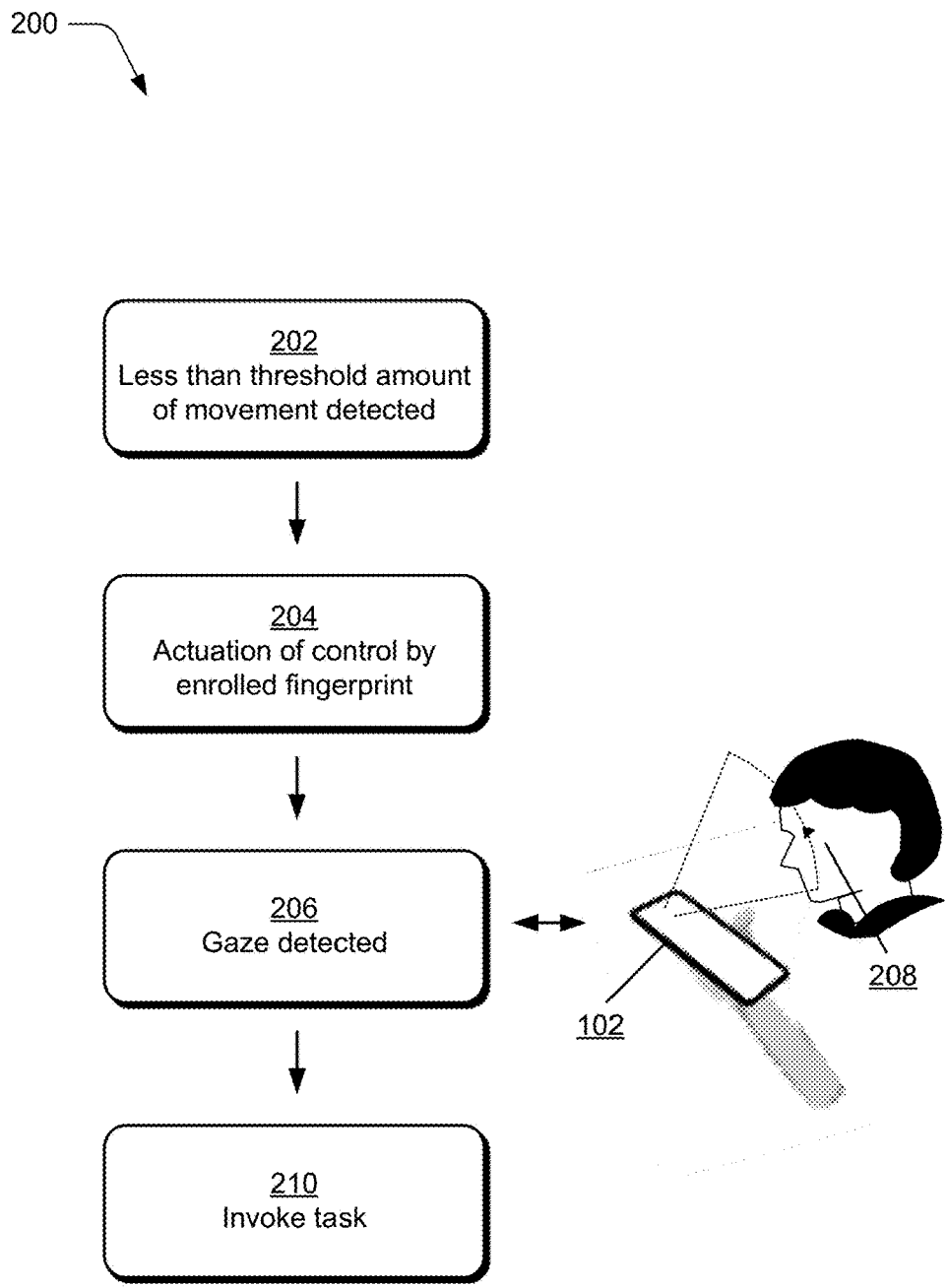
FIG. 2 depicts a scenario for invoking a task based on touch actuation and gaze detection in accordance with one or more implementations.

FIGS. 2-6 depict different scenarios that describe aspects of implementations for task invocation based on control actuation, fingerprint detection, and gaze detection. For instance, FIG. 2 depicts a scenario 200 for invoking a task based on touch actuation and gaze detection. At 202, the motion module 124 detects less than a threshold amount of movement of the mobile device 102 and at 204, the authentication module 122 detects actuation of the actuatable control 108 by an enrolled fingerprint. The motion module 124, for instance, utilizes a motion threshold that is based on an amount of detected movement of the mobile device 102. In at least one implementation, when movement of the mobile device 102 is below the motion threshold, this indicates that the mobile device 102 is stationary. The user 104, for instance, is holding the mobile device 102 in a stationary position and/or the mobile device 102 is resting on a surface such as a desk or a table.

To select the actuatable control 108, the user applies a finger to the actuatable control 108. Further, the fingerprint sensor 116 captures fingerprint features and communicates the fingerprint features to the authentication module 122. The authentication module 122 compares the fingerprint features to different fingerprints that have been enrolled with the mobile device 102. An "enrolled" fingerprint, for instance, represents a fingerprint that has been registered with the authentication module 122 as corresponding to a user identity that is permitted to invoke different tasks on the mobile device 102, such as to unlock the mobile device 102 from a locked state.

Continuing with the scenario 200, at 206 the gaze module 126 utilizes image data captured by the image sensor 118 to detect a user gaze, e.g., that the user 104 is visually engaged with the mobile device 102. The image sensor 118, for instance, captures facial features of the user's face 208 and communicates the facial features to the gaze module 126, which performs feature recognition on the features to determine whether the user 104 is gazing at the mobile device 102. In at least one implementation, the authentication module 122 may also implement facial recognition on the facial features to determine if the facial features match an enrolled face, e.g., a face that matches a use identity associated with the enrolled fingerprint.

Accordingly, based on actuation of the actuatable control 108 by the enrolled fingerprint and user gaze being verified, at 210 the task module 106 invokes a task on the mobile device 102.

Figure 3:
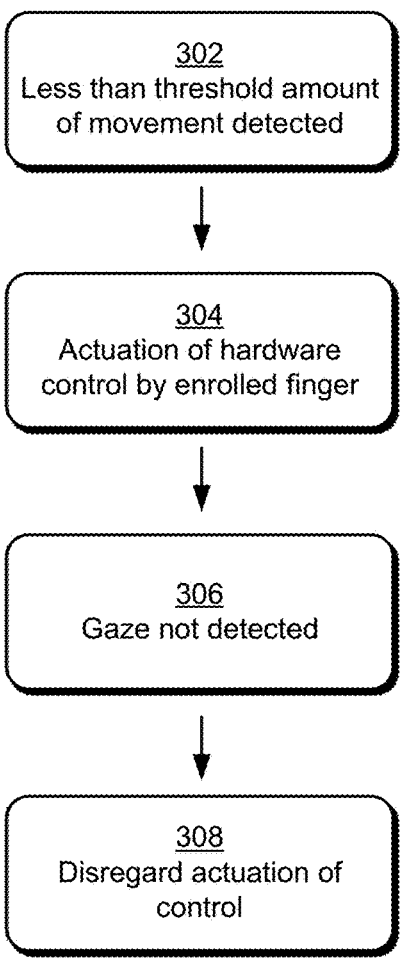
FIG. 3 depicts a scenario for disregarding actuation of a control based on touch actuation and gaze detection in accordance with one or more implementations.
Figure 3:
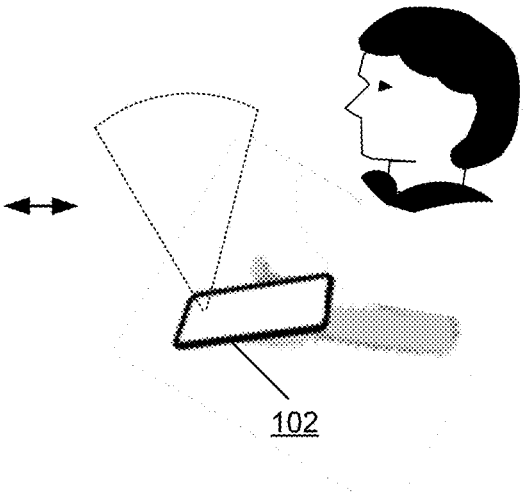

FIG. 3 depicts a scenario 300 for disregarding actuation of a control based on touch actuation and gaze detection. At 302, the motion module 124 detects less than a threshold amount of movement of the mobile device 102 and at 304, the authentication module 122 detects actuation of the actuatable control 108 by an enrolled fingerprint. At 306, however, the gaze module 126 fails to detect a user's gaze. The gaze module 126, for instance, obtains image capture data from the image sensor 118 and processes the image capture data. Based on the processed image capture data, the gaze module 126 fails to verify that a user is gazing at the mobile device 102. Accordingly, at 308 actuation of the actuatable control 108 is disregarded. For instance, a task is not invoked despite the actuation of the actuatable control 108 by an enrolled finger. The task module 106, for example, fails to receive verification from the gaze module 126 that a user is visual engaged with the mobile device 102. Alternatively or additionally, the gaze module 126 notifies the task module 106 that no user gaze is detected. Accordingly, the task module 106 does not invoke an associated task, such as unlocking the mobile device 102. In at least one implementation, the scenario 300 can occur when a user unintentionally touches the actuatable control 108 and thus does not intend to invoke the task module 106.

Figure 4:
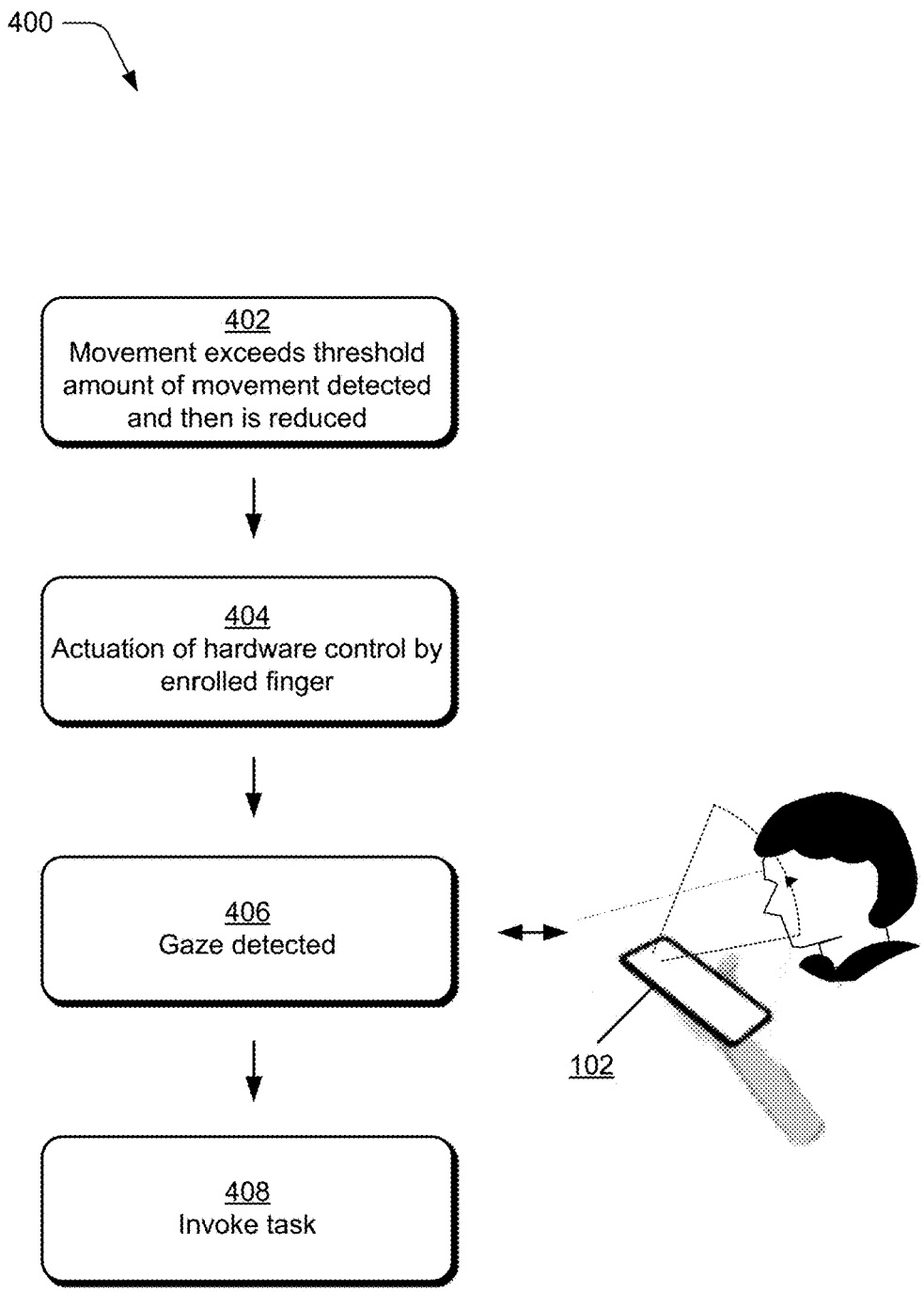
FIG. 4 depicts a scenario for invoking a task based on motion detection, touch actuation, and gaze detection in accordance with one or more implementations described herein.

FIG. 4 depicts a scenario 400 for invoking a task based on motion detection, touch actuation, and gaze detection. At 402, the motion module 124 detects that movement of the mobile device 102 exceeds a threshold amount of movement and then is reduced to less than the threshold amount of movement. The motion module 124, for instance, determines based on motion data from the motion sensor 120 that the movement of the mobile device 102 increases from a stationary position to exceed a motion threshold, and then returns to a stationary position within a threshold period of time, e.g., 5 seconds or less. Further, at 404 the authentication module 122 detects actuation of the actuatable control 108 by an enrolled fingerprint. The gaze module 126 then processes image data received from the image sensor 118 and determines at 406 that a user's gaze is detected. Accordingly, at 408 the task module 106 invokes a task. Generally, the scenario 400 can occur when a user is handling the mobile device 102, such as picking up the device from a stationary position while visually engaged with the mobile device.

Figure 5:
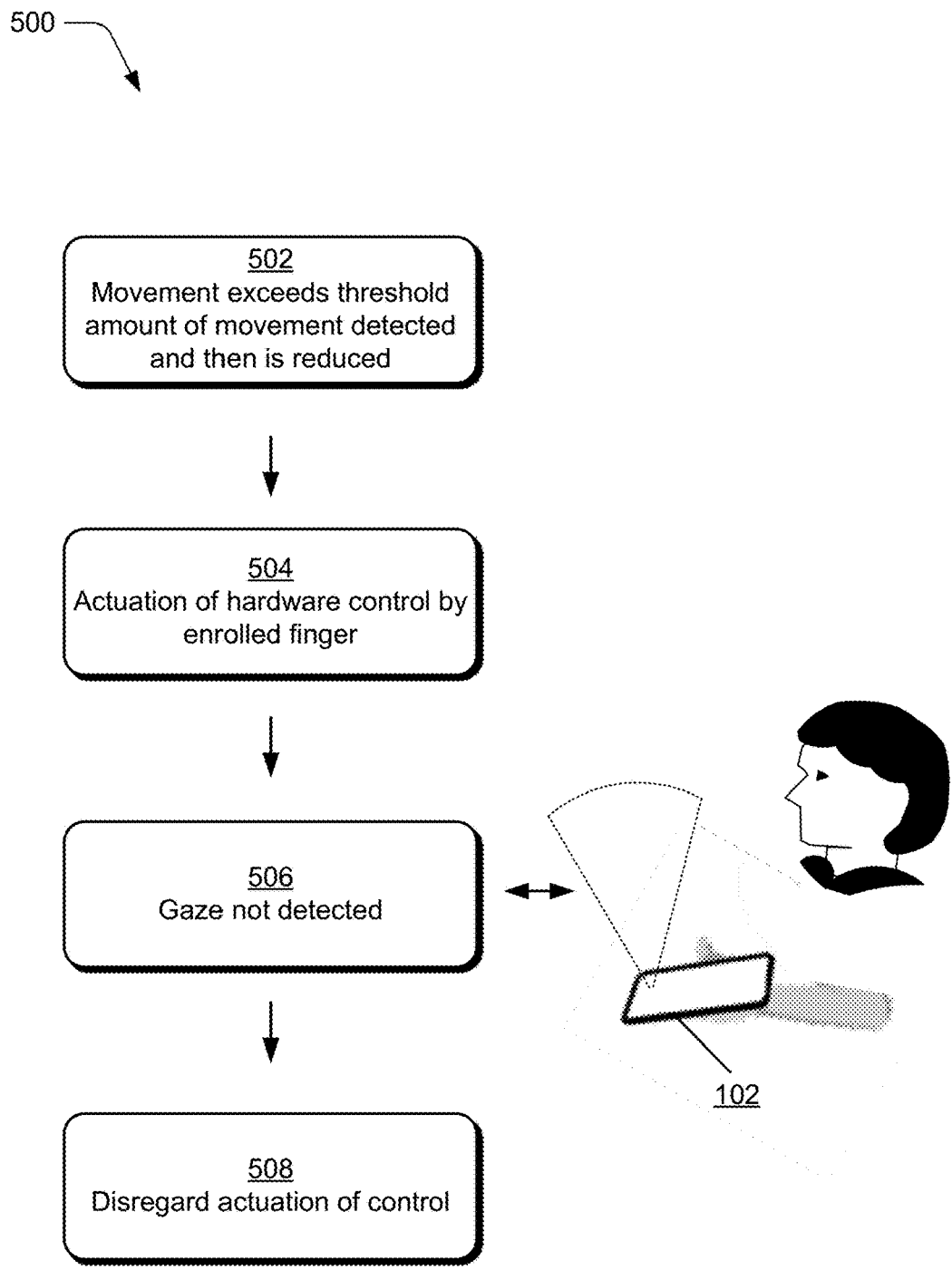
FIG. 5 depicts a scenario for preventing a task from being invoked based on motion detection, touch actuation, and gaze detection in accordance with one or more implementations described herein.

FIG. 5 depicts a scenario 500 for preventing a task from being invoked based on motion detection, touch actuation, and gaze detection. At 502, the motion module 124 detects that movement of the mobile device 102 exceeds a threshold amount of movement and then is reduced to less than the threshold amount of movement. The motion module 124, for instance, determines based on motion data from the motion sensor 120 that the movement of the mobile device 102 increases from a stationary position to exceed a motion threshold, and then returns to a stationary position within a threshold period of time. Further, at 504 the authentication module 122 detects actuation of the actuatable control 108 by an enrolled fingerprint. The gaze module 126 then processes image data received from the image sensor 118 and determines at 506 that a user's gaze is not detected. Accordingly, at 508 actuation of the actuatable control 108 is disregarded. For instance, a task associated with the actuatable control 108 is not invoked despite the actuation of the actuatable control 108 by an enrolled finger.

Figure 6:
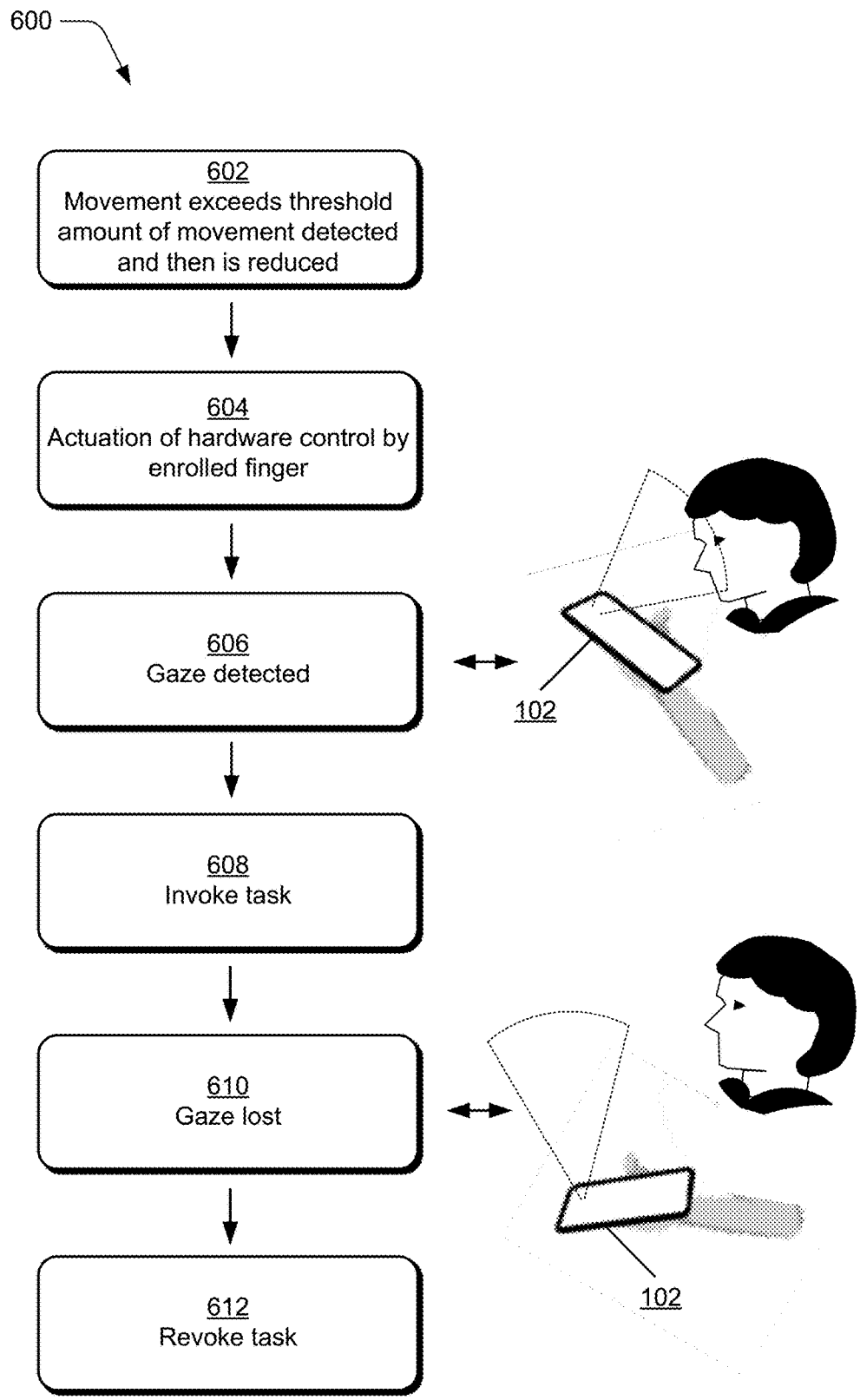
FIG. 6 depicts a scenario for invoking and revoking a task based on motion detection, touch actuation, and gaze detection in accordance with one or more implementations described herein.

FIG. 6 depicts a scenario 600 for invoking and revoking a task based on motion detection, touch actuation, and gaze detection. At 602, the motion module 124 detects that movement of the mobile device 102 exceeds a threshold amount of movement and then is reduced to less than the threshold amount of movement. The motion module 124, for instance, determines based on motion data from the motion sensor 120 that the movement of the mobile device 102 increases from a stationary position to exceed a motion threshold, and then returns to a stationary position within a threshold period of time. Further, at 604 the authentication module 122 detects actuation of the actuatable control 108 by an enrolled fingerprint. The gaze module 126 then processes image data received from the image sensor 118 and determines at 606 that a user's gaze is detected. Accordingly, at 608 the task module 106 invokes a task. The task module 106, for instance, causes the mobile device 102 to transition from a locked state to an unlocked state.

After invoking the task at 608, the gaze module 126 detects at 610 that the user's gaze is no longer detected, e.g., detection of the user's gaze is lost. For instance, after causing a task to be invoked at 608, the task module 106 continues to monitor for user gaze state. Accordingly, if the user's gaze is no longer detected within a threshold period of time (a "gaze detection threshold") after invoking the task, at 612 the task is revoked. In a device lock/unlock scenario, for example, the mobile device 102 is transitioned from an unlocked state to a locked state. Generally, the scenario 600 can occur when a user actuates the actuatable control 108 with an enrolled finger while gazing at the mobile device 102, and then diverts their gaze away from the mobile device 102 within the gaze detection threshold. This may indicate, for example, that the user does not intend to invoke a task associated with selection of the actuatable control 108, and/or that the user's attention is diverted away from the mobile device 102 and thus an invoked task is to be revoked.

The different actions and operations described in the scenarios above generally represent actions and operations of functionalities of the mobile device 102, such as described with reference to the environment 100. Further, the scenarios can be combined in different ways to accommodate a variety of different changes in device state, such as changes in hardware actuation, device motion, gaze state, and so forth.

Figure 7:
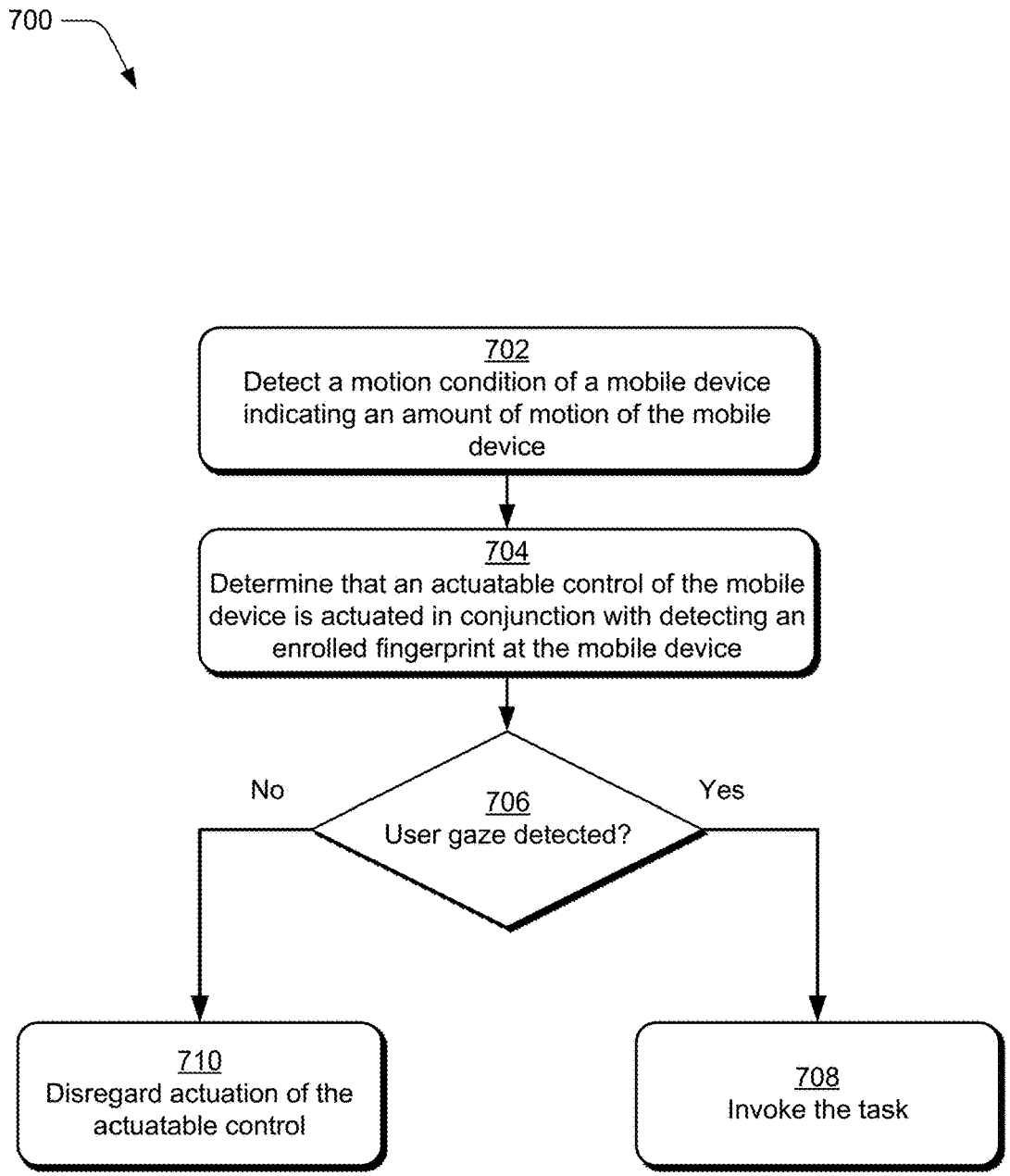
FIG. 7 depicts a method for task invocation based on control actuation, fingerprint detection, and gaze detection in accordance with one or more implementations described herein.

FIG. 7 depicts a method 700 for task invocation based on control actuation, fingerprint detection, and gaze detection in accordance with one or more implementations. At 702, a motion condition of a mobile device is detected indicating an amount of motion of the mobile device. The motion module 124, for instance, receives sensor data from the motion sensor 120, and utilizes the sensor data to characterize the relative motion of the mobile device 102. The motion module 124 can then notify the task module 106 of the relative motion of the mobile device 102, such as an indication that motion of the mobile device 102 is below a motion threshold (e.g., the mobile device 102 is stationary) or that motion of the mobile device 102 is above the motion threshold, e.g., the mobile device 102 is in motion. Further, the motion module 124 can provide an indication that motion of the mobile device 102 changes in various ways, such as an increase in motion, a decrease in motion. In one particular implementation, the motion module 124 can provide an indication that motion of the mobile device increases from below the motion threshold to above the motion threshold, and then back below the motion threshold. Further this change in motion can be characterized as occurring within a threshold period of time, e.g., a motion change time threshold.

At 704, it is determined that an actuatable control of the mobile device is actuated in conjunction with detecting an enrolled fingerprint at the mobile device. The task module 106, for instance, determines that the actuatable control 108 is actuated in conjunction with an enrolled fingerprint being detected by the fingerprint sensor 116. In at least one implementation, the sensor system 110 detects actuation of the actuatable control 108 and the enrolled fingerprint at the fingerprint sensor 116 and notifies the task module 106.

At 706, it is determined whether a user gaze is detected at the mobile device. The gaze module 126, for instance, receives image data captured by the image sensor 118 and processes the data to determine whether a user gaze is detected in the image data. For example, the gaze module 126 can implement a facial recognition algorithm to process the image data and determine whether a facial features (e.g., eyes) of a user are detected in a gazing orientation relative to the mobile device 102, e.g., a front surface of the mobile device. Further, the gaze module 126 can utilize a gaze duration threshold to determine whether a gaze is detected. For instance, to determine that a gaze is detected, the user gaze is to be detected consistently for the gaze duration threshold, e.g., for at least n seconds. A user, for example, may glance at the mobile device 102 for a brief period (e.g., less than the gaze duration threshold) and then look away. In this case, the gaze module 126 may indicate that no gaze is detected.

In at least one implementation, the authentication module 122 may also processes the image data to determine whether detected facial features correspond to enrolled facial features, e.g., facial features that match those of a user registered with the mobile device 102. A registered user, for instance, represents a user identity that is authorized to invoke functionality of the task module 106. Thus, some implementations can combine gaze detection and facial recognition to determine whether facial features of a registered user are detected as in a gazing orientation relative to the mobile device 102. According, it is determined whether to invoke a task associated with the actuatable control based on the motion condition and whether the user gaze is detected at the mobile device.

If a user gaze is detected ("Yes"), at 708 a task associated with the actuatable control is invoked. The task module 106, for instance, executes a particular task and/or set of tasks. Examples of such tasks include unlocking the mobile device 102 from a locked state, waking the mobile device 102 from an inactive state, providing an indication of the presence of an authenticated user to other processes and/or applications of the mobile device 102, and so forth.

If a user gaze is not detected ("No"), at 710 actuation of the actuatable control is disregarded. For instance, a task associated with the actuatable control is not executed. In at least one implementation, a user prompt (e.g., a visual and/or audible prompt) can be output in response to a user gaze not being detected, such as to prompt a user to place their face in a gazing orientation relative to the mobile device 102. A user, for instance, may be unaware that their face is not properly oriented relative to the mobile device 102 to invoke functionality of the actuatable control 108. Thus, the gaze module 126 may continue to monitor for user gaze for a threshold period of time (a "gaze time threshold") after actuation of the actuatable control 108 and detection of an enrolled fingerprint before deciding to disregard actuation of the actuatable control. For instance, if no gaze is immediately detected, decision 706 may proceed for the gaze time threshold prior to proceeding to 708 or 710.

Figure 8:
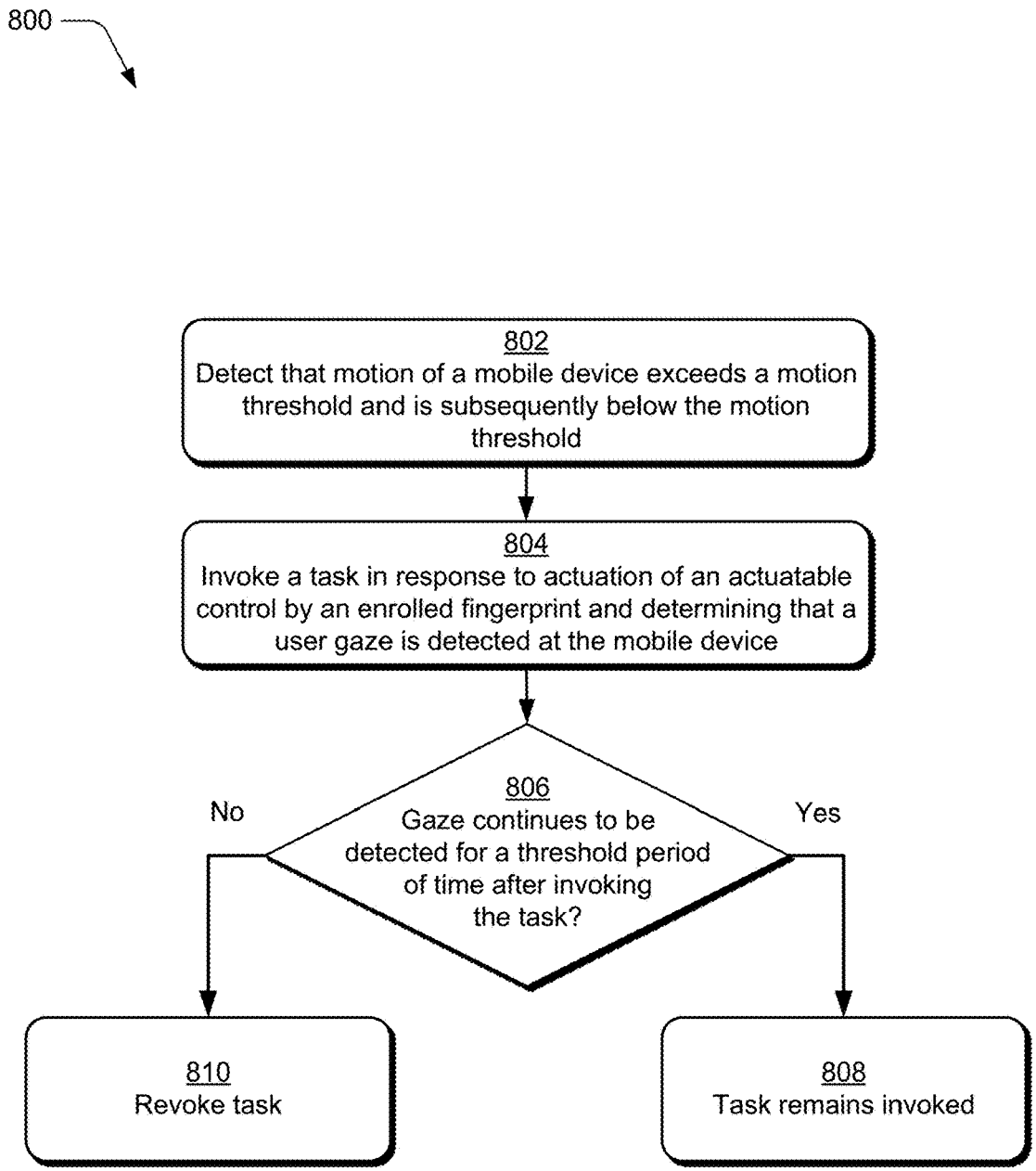
FIG. 8 depicts a method for revoking a task in accordance with one or more implementations described herein.

FIG. 8 depicts a method 800 for revoking a task in accordance with one or more implementations. The method 800, for example, can be implemented in conjunction with the method 700. At 802, a motion condition is detected that motion of a mobile device exceeds a motion threshold and is subsequently below the motion threshold. The motion module 124, for instance, receives motion data from the motion sensor 120 indicating the motion of the mobile device 102 is below a motion threshold, proceeds to above the motion threshold, and then returns to below the motion threshold. Further, the motion module 124 can determine that this motion condition occurs within a motion change time threshold.

At 804, a task is invoked in response to actuation of an actuatable control by an enrolled fingerprint and determining that a user gaze is detected at the mobile device. The task module 106, for instance, causes a particular task and/or set of tasks associated with the actuatable control to be executed. Examples of different tasks are described above.

At 806, it is determined whether the gaze continues to be detected for a threshold period of time after invoking the task. The gaze module 126, for instance, continues to monitor for user gaze for a period of time (e.g., a gaze detection time threshold) after the task is invoked.

If the gaze is detected for the threshold period of time after invoking the task ("Yes"), at 808 the task remains invoked. For instance, in a device unlock implementation, the mobile device 102 remains unlocked. Further, the gaze module 126 and/or the task module 106 may discontinue monitoring for user gaze, at least for purposes of the invoked task.

If the gaze is not detected for the threshold period of time after invoking the task ("No"), at 810 the task is revoked. The task module 106, for instance, receives a notification from the gaze module 126 within a gaze detection time threshold after the task is invoked that the user gaze is no longer detected, e.g., that the user gaze is lost at the mobile device 102. Accordingly, the task module 106 revokes the task. In a device unlock scenario, this can include locking the mobile device 102.

Thus, implementations of task invocation based on control actuation, fingerprint detection, and gaze detection provide ways for cooperatively using control actuation and gaze detection to invoke a task.

The example methods described above may be performed in various ways, such as for implementing different aspects of the systems and scenarios described herein. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations can be performed in any order to perform a method, or an alternate method.

Figure 9:
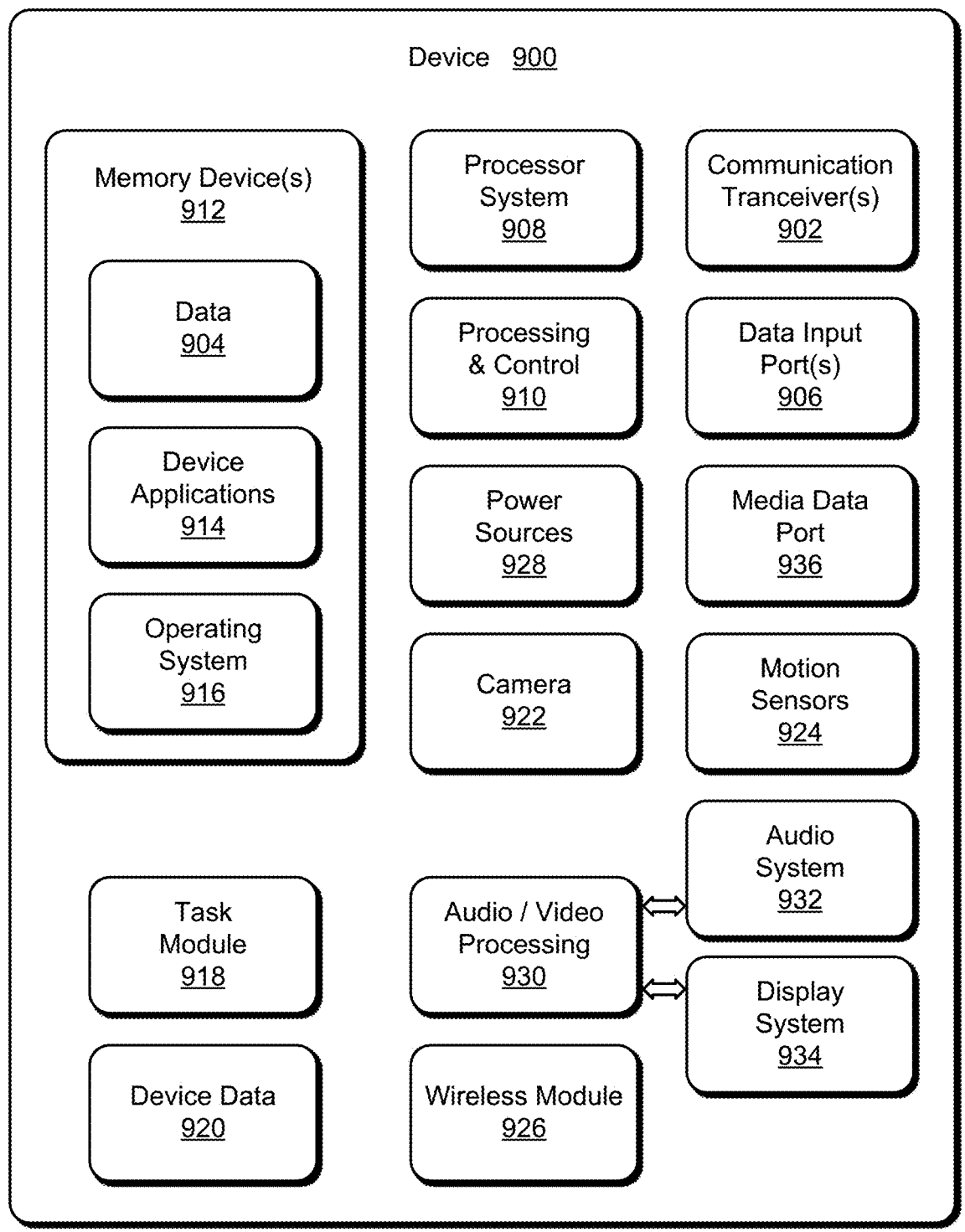
FIG. 9 illustrates various components of an example device that can implement aspects of task invocation based on control actuation, fingerprint detection, and gaze detection.

FIG. 9 illustrates various components of an example device 900 in which aspects of task invocation based on control actuation, fingerprint detection, and gaze detection can be implemented. The example device 900 can be implemented as any of the devices described with reference to the previous FIGS. 1-8, such as any type of mobile device, mobile phone, mobile device, wearable device, tablet, computing, communication, entertainment, gaming, media playback, and/or other type of electronic device. For example, the mobile device 102 as shown and described with reference to FIGS. 1-8 may be implemented as the example device 900.

The device 900 includes communication transceivers 902 that enable wired and/or wireless communication of data 904 with other devices. The data 904 can include any of device identifying data, device location data, wireless connectivity data, and wireless protocol data. Additionally, the data 904 can include any type of audio, video, and/or image data. Example communication transceivers 902 include wireless personal area network (WPAN) radios compliant with various IEEE 902.15 (Bluetoothim) standards, wireless local area network (WLAN) radios compliant with any of the various IEEE 902.11 (Wi-Fi™) standards, wireless wide area network (WWAN) radios for cellular phone communication, wireless metropolitan area network (WMAN) radios compliant with various IEEE 902.16 (WiMAX™) standards, and wired local area network (LAN) Ethernet transceivers for network data communication.

The device 900 may also include one or more data input ports 906 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 900 includes a processing system 908 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 910. The device 900 may further include any type of a system bus or other data and command transfer system that couples the various components within the device. A system bus can include any one or combination of different bus structures and architectures, as well as control and data lines.

The device 900 also includes computer-readable storage memory 912 (e.g., memory devices) that enable data storage, such as data storage devices that can be accessed by a computing device, and that provide persistent storage of data and executable instructions (e.g., software applications, programs, functions, and the like). Examples of the computer-readable storage memory 912 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 900 may also include a mass storage media device.

The computer-readable storage memory 912 provides data storage mechanisms to store the data 904, other types of information and/or data, and various device applications 914 (e.g., software applications). For example, an operating system 916 can be maintained as software instructions with a memory device and executed by the processing system 908. The device applications may also include a device manager, such as any form of a control application, software application, signal-processing and control module, code that is native to a particular device, a hardware abstraction layer for a particular device, and so on. Computer-readable storage memory 912 represents media and/or devices that enable persistent and/or non-transitory storage of information in contrast to mere signal transmission, carrier waves, or signals per se. Computer-readable storage memory 912 do not include signals per se or transitory signals.

In this example, the device 900 includes a task module 918 that implements aspects of task invocation based on control actuation, fingerprint detection, and gaze detection, and may be implemented with hardware components and/or in software as one of the device applications 914, such as when the device 900 is implemented as the mobile device 102. An example, the task module 918 can be implemented as the task module 106 described in detail above. In implementations, the task module 918 may include independent processing, memory, and logic components as a computing and/or electronic device integrated with the device 900. The device 900 also includes device data 920 for implementing aspects of task invocation based on control actuation, fingerprint detection, and gaze detection, and may include data from the task module 106.

In this example, the example device 900 also includes a camera 922 and motion sensors 924, such as may be implemented in an inertial measurement unit (IMU). The motion sensors 924 can be implemented with various sensors, such as a gyroscope, an accelerometer, and/or other types of motion sensors to sense motion of the device. The various motion sensors 924 may also be implemented as components of an inertial measurement unit in the device.

The device 900 also includes a wireless module 926, which is representative of functionality to perform various wireless communication tasks. For instance, for the mobile device 102, the wireless module 926 can be leveraged to scan for and detect wireless networks, as well as negotiate wireless connectivity to wireless networks for the mobile device 102. The device 900 can also include one or more power sources 928, such as when the device is implemented as a mobile device. The power sources 928 may include a charging and/or power system, and can be implemented as a flexible strip battery, a rechargeable battery, a charged super-capacitor, and/or any other type of active or passive power source. Generally, utilizing implementations of task invocation based on control actuation, fingerprint detection, and gaze detection enables the power sources 928 to be conserved by avoiding inadvertent actuation of functionality of the device 900.

The device 900 also includes an audio and/or video processing system 930 that generates audio data for an audio system 932 and/or generates display data for a display system 934. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 936. In implementations, the audio system and/or the display system are integrated components of the example device. Alternatively, the audio system and/or the display system are external, peripheral components to the example device.

Although implementations of task invocation based on control actuation, fingerprint detection, and gaze detection have been described in language specific to features and/or methods, the subject of the appended claims is not necessarily limited to the specific features or methods described. Rather, the features and methods are disclosed as example implementations of task invocation based on control actuation, fingerprint detection, and gaze detection, and other equivalent features and methods are intended to be within the scope of the appended claims. Further, various different examples are described, and it is to be appreciated that each described example can be implemented independently or in connection with one or more other described examples. Additional aspects of the techniques, features, and/or methods discussed herein relate to one or more of the following:

A mobile device including: an actuatable control with an integrated fingerprint sensor; a sensor system including a motion sensor and an image sensor; and a task module implemented to: detect based on motion data from the motion sensor that motion of the mobile device is less than a motion threshold; determine that the actuatable control is actuated and that an enrolled fingerprint is detected in contact with the fingerprint sensor; determine whether image data obtained by the image sensor indicates that a user gaze is detected at the mobile device; and determine whether to invoke a task associated with actuation of the actuatable control based on whether the user gaze is detected at the mobile device.

Alternatively or in addition to the above described device, any one or combination of: wherein the actuatable control includes a hardware button and the fingerprint sensor is integrated into the hardware button; wherein the motion threshold includes a predefined amount of motion of the mobile device; wherein the enrolled fingerprint includes a fingerprint that is registered with the mobile device as associated with a user identity that is permitted to invoke the task associated with actuation of the actuatable control; wherein to determine whether to invoke a task associated with actuation of the actuatable control is further based on whether facial features of a user gaze detected at the mobile device match facial features registered with the mobile device as associated with a user identity that is permitted to invoke the task associated with actuation of the actuatable control; wherein the task module is further implemented to invoke the task in response to determining that a user's gaze is detected at the mobile device; wherein the task module is further implemented to disregard actuation of the actuatable control in response to determining that a user's gaze is not detected at the mobile device.

A method, including: detecting a motion condition of a mobile device indicating an amount of motion of the mobile device; determining that an actuatable control of the mobile device is actuated in conjunction with detecting an enrolled fingerprint at the mobile device; determining whether a user gaze is detected at the mobile device; and determining whether to invoke a task associated with the actuatable control based on the motion condition and whether the user gaze is detected at the mobile device.

Alternatively or in addition to the above described method, any one or combination of: wherein the motion condition is based on comparing a detected amount of motion of the mobile device to a predefined motion threshold; wherein said determining that the actuatable control of the mobile device is actuated further includes determining that the actuatable control of the mobile device is actuated concurrently while the motion condition applies; wherein the motion condition includes an indication that the motion of the mobile device is below a motion threshold, and wherein the method further includes invoking the task in response to determining that a user's gaze is detected at the mobile device; wherein the motion condition includes an indication that the motion of the mobile device is below a motion threshold, and wherein the method further includes disregarding actuation of the actuatable control in response to determining that a user's gaze is not detected at the mobile device; wherein the motion condition includes an indication that the motion of the mobile device exceeds a motion threshold and is subsequently below the motion threshold, and wherein the method further includes invoking the task in response to determining that the user gaze is detected at the mobile device in conjunction with the motion of the mobile device being below the motion threshold; wherein the motion condition includes an indication that the motion of the mobile device exceeds a motion threshold and is subsequently below the motion threshold, and wherein the method further includes disregarding actuation of the actuatable control in response to determining that a user's gaze is not detected at the mobile device in conjunction with the motion of the mobile device being below the motion threshold; wherein the motion condition includes an indication that the motion of the mobile device exceeds a motion threshold and is subsequently below the motion threshold, and wherein the method further includes: invoking the task in response to determining that the user gaze is detected at the mobile device; and revoking the task in response to detecting within a threshold period of time after invoking that task that the user gaze is subsequently not detected at the mobile device.

A mobile device including: an actuatable control with an integrated fingerprint sensor; a sensor system including a motion sensor and an image sensor; and a task module implemented to: detect a change in motion of the mobile device based on motion data from the motion sensor; determine, in conjunction with the change in motion, that the actuatable control is actuated and that an enrolled fingerprint is detected in contact with the fingerprint sensor; determine whether image data obtained by the image sensor indicates that a user gaze is detected at the mobile device, and determine whether to invoke a task associated with actuation of the actuatable control based on whether the user gaze is detected at the mobile device.

Alternatively or in addition to the above described device, any one or combination of: wherein to detect the change in motion includes to detect that motion of the mobile device exceeds a motion threshold and is subsequently below the motion threshold; wherein the task module is further implemented to determine that the image data indicates that a user gaze is detected at the mobile device and in response, to invoke the task associated with actuation of the actuatable control; wherein the task module is further implemented to determine that the image data indicates that a user gaze is not detected at the mobile device and in response, disregard actuation of the actuatable control; wherein the task module is further implemented to determine that the image data indicates that a user gaze is detected at the mobile device and in response, to invoke the task associated with actuation of the actuatable control; determine, within a threshold period of time after invoking the task, that further image data from the image sensor indicates that the user gaze is no longer detected; and revoke the task in response to the user gaze being no longer detected.

The invention claimed is:
1. A mobile device comprising:
an actuatable control with an integrated fingerprint sensor;
a sensor system including a motion sensor and an image sensor; and
a task module implemented to:
detect, based on motion data from the motion sensor a change in motion of the mobile device that is in a locked state, including an indication that motion of the mobile device exceeds a first motion threshold and subsequently is less than a second motion threshold that is different from the first motion threshold within 5 seconds;
determine that the actuatable control is actuated to invoke a task if the motion of the mobile device exceeds the first motion threshold and subsequently is less than the second motion threshold within 5 seconds and if an enrolled fingerprint is detected in contact with the fingerprint sensor;
monitor a user gaze to obtain, by the image sensor, image data of a user that includes facial features of the user in a gazing orientation relative to a front surface of the mobile device that includes eyes that are looking directly at the front surface of the mobile device;
determine whether the facial features based on the user gaze of the user match a user identity associated with the enrolled fingerprint;
determine, based on the change in motion, whether the image data of the user obtained by the image sensor indicates that a user gaze is detected at the mobile device and whether the user gaze persists for a threshold time period; and
determine to discontinue monitoring of the user gaze and to disregard the actuation of the actuatable control by revoking the task and maintaining the mobile device in the locked state if the user gaze does not match the user identity associated with the enrolled fingerprint and if the user gaze does not persist for the threshold time period.

2. The mobile device of claim 1, wherein the actuatable control comprises a hardware button and the fingerprint sensor is integrated into the hardware button.

3. The mobile device of claim 1, wherein the first motion threshold comprises a predefined amount of motion of the mobile device.

4. The mobile device of claim 1, wherein the enrolled fingerprint comprises a fingerprint that is registered with the mobile device as associated with a user identity that is permitted to invoke a task associated with actuation of the actuatable control.

5. The mobile device of claim 1, wherein to determine whether image data obtained by the image sensor indicates that the user gaze is detected at the mobile device further comprises determining whether facial features of the user gaze detected at the mobile device match facial features registered with the mobile device as associated with a user identity that is permitted to invoke a task associated with actuation of the actuatable control.

6. The mobile device of claim 1, wherein the task module is further implemented to invoke a task associated with actuation of the actuatable control in response to determining that the user gaze is detected at the mobile device.

7. The mobile device of claim 1, wherein to determine to disregard actuation of the actuatable control further comprises preventing a task associated with actuation of the actuatable control from being performed.

8. The mobile device of claim 7, wherein the task associated with actuation of the actuatable control further comprises to transition the mobile device from the locked state to an unlocked state, and to prevent the task associated with actuation of the actuatable control from being performed comprises to prevent the mobile device from transitioning to the unlocked state.

9. The mobile device of claim 1, wherein to monitor the user gaze includes outputting a prompt in response to the user gaze not being detected to instruct the user to place their face in the gazing orientation relative to the front surface of the mobile device.

10. A method comprising:
   detecting, based on motion data, a change in motion of a mobile device that is in a locked state including an indication that motion of the mobile device exceeds a first motion threshold and subsequently is less than a second motion threshold that is different from the first motion threshold within 5 seconds;
   determining that an actuatable control of the mobile device is actuated to invoke a task if the motion of the mobile device exceeds the first motion threshold and subsequently is less than the second motion threshold within 5 seconds and if an enrolled fingerprint is detected in contact with a fingerprint sensor of the mobile device;
   monitoring a user gaze to obtain, by an image sensor, image data of a user that includes facial features of the user in a gazing orientation relative to a front surface of the mobile device that includes eyes that are looking directly at the front surface of the mobile device;
   determining whether the facial features based on the user gaze of the user match a user identity associated with the enrolled fingerprint;
   determining, based on detecting the change in motion, whether the image data of the user obtained by the image sensor of the mobile device indicates that a user gaze is detected at the mobile device and whether the user gaze persists for a threshold time period; and
   determining to discontinue monitoring of the user gaze and to disregard the actuation of the actuatable control by revoking the task and maintaining the mobile device in the locked state if the user gaze does not match the user identity associated with the enrolled fingerprint and if the user gaze does not persist for the threshold time period.

11. The method of claim 10, wherein the actuatable control comprises a hardware button and the fingerprint sensor is integrated into the hardware button.

12. The method of claim 10, wherein the first motion threshold comprises a predefined amount of motion of the mobile device.

13. The method of claim 10, wherein the enrolled fingerprint comprises a fingerprint that is registered with the mobile device as associated with a user identity that is permitted to invoke a task associated with actuation of the actuatable control.

14. The method of claim 10, wherein determining whether image data obtained by the image sensor indicates that the user gaze is detected at the mobile device further comprises determining whether facial features of a user gaze detected at the mobile device match facial features registered with the mobile device as associated with a user identity that is permitted to invoke a task associated with actuation of the actuatable control.

15. The method of claim 10, further comprising invoking a task associated with actuation of the actuatable control in response to subsequently determining that the user gaze is detected at the mobile device.

16. The method of claim 10, wherein determining to disregard actuation of the actuatable control comprises preventing a task associated with actuation of the actuatable control from being performed.

17. The method of claim 16, wherein the task associated with actuation of the actuatable control comprises transitioning the mobile device from the locked state to an unlocked state, and preventing the task associated with actuation of the actuatable control from being performed comprises preventing the mobile device from transitioning to the unlocked state.

18. A system comprising:
   a processor; and
   computer-readable storage media storing instructions that are executable by the processor to perform operations comprising:
      detecting, based on motion data, a change in motion of a mobile device that is in a locked state including an indication that motion of the mobile device exceeds a first motion threshold and subsequently is less than a second motion threshold that is different from the first motion threshold within 5 seconds;
      determining that an actuatable control of the mobile device is actuated to invoke a task if the motion of the mobile device exceeds the first motion threshold and subsequently is less than the second motion threshold within 5 seconds and if an enrolled fingerprint is detected in contact with a fingerprint sensor of the mobile device;
      monitoring a user gaze to obtain, by an image sensor, image data of a user that includes facial features of the user in a gazing orientation relative to a front surface of the mobile device that includes eyes that are looking directly at the front surface of the mobile device;
      determining whether the facial features based on the user gaze of the user match a user identity associated with the enrolled fingerprint;
      determining, based on detecting the change in motion, whether the image data of the user obtained by the image sensor of the mobile device indicates that a user gaze is detected at the mobile device and whether the user gaze persists for a threshold time period; and
      determining discontinue monitoring of the user gaze and to disregard the actuation of the actuatable control by revoking the task and maintaining the mobile device in the locked state if the user gaze does not match the user identity associated with the enrolled fingerprint and if the user gaze does not persist for the threshold time period.

19. The system of claim 18, wherein the first motion threshold comprises a predefined amount of motion of the mobile device.

20. The system of claim 18, wherein determining to disregard actuation of the actuatable control comprises preventing a task associated with actuation of the actuatable control from being performed.

* * * * *